United States Patent
Cox et al.

(10) Patent No.: US 11,327,704 B2
(45) Date of Patent: May 10, 2022

(54) METHOD AND SYSTEM FOR MONITOR BRIGHTNESS CONTROL USING AN AMBIENT LIGHT SENSOR ON A MOBILE DEVICE

(71) Applicants: Claude Lano Cox, Austin, TX (US); Liam B. Quinn, Austin, TX (US); Mark W. Welker, Austin, TX (US); Rocco Ancona, Austin, TX (US)

(72) Inventors: Claude Lano Cox, Austin, TX (US); Liam B. Quinn, Austin, TX (US); Mark W. Welker, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 14/290,361

(22) Filed: May 29, 2014

(65) Prior Publication Data
US 2015/0348460 A1 Dec. 3, 2015

(51) Int. Cl.
*G06F 3/14* (2006.01)

(52) U.S. Cl.
CPC ....... *G06F 3/14* (2013.01); *G09G 2320/0626* (2013.01); *G09G 2360/144* (2013.01)

(58) Field of Classification Search
CPC ... G09G 2320/0233; G09G 2320/0271; G09G 2320/0276; G09G 2320/0285; G09G 2320/029; G09G 2320/0295; G09G 2320/045; G09G 2320/046; G09G 2320/048; G09G 2320/06–0693; G09G 2320/08; G09G 2360/14–148; G09G 2360/16
See application file for complete search history.

(56) References Cited

U.S. PATENT DOCUMENTS

| | | | | |
|---|---|---|---|---|
| 2008/0186393 A1* | 8/2008 | Lee | ....... | G09G 3/3406 348/301 |
| 2010/0039414 A1* | 2/2010 | Bell | ....... | G09G 3/20 345/207 |
| 2010/0079426 A1* | 4/2010 | Pance | ....... | G06T 11/001 345/207 |
| 2013/0120656 A1* | 5/2013 | Wilson | ....... | G06F 3/1462 348/563 |
| 2013/0167159 A1* | 6/2013 | Ricci | ....... | G06F 9/54 719/319 |
| 2014/0087708 A1* | 3/2014 | Kalita | ....... | H04W 4/04 455/418 |
| 2014/0168277 A1* | 6/2014 | Ashley | ....... | G06F 3/1446 345/672 |

* cited by examiner

*Primary Examiner* — William Boddie
*Assistant Examiner* — Jeffrey Parker
(74) *Attorney, Agent, or Firm* — Baker Botts L.L.P.

(57) ABSTRACT

Systems and methods for monitor brightness control are disclosed. The method includes connecting with a device via a dock, the device including a sensor configured to detect a lighting condition of an environment surrounding the device. The method further includes linking the dock with a monitor. The method further includes detecting the lighting condition. Additionally, in response to a change in the lighting condition, the method includes matching the lighting condition with a monitor brightness setting in a plurality of brightness look-up-tables and adjusting a brightness level of the monitor based on the monitor brightness setting.

20 Claims, 3 Drawing Sheets

METHOD AND SYSTEM FOR MONITOR BRIGHTNESS CONTROL USING AN AMBIENT LIGHT SENSOR ON A MOBILE DEVICE

TECHNICAL FIELD

The present disclosure relates in general to information handling systems, and more particularly to a method and system for display brightness control using an ambient light sensor on a mobile device.

BACKGROUND

As the value and use of information continues to increase, individuals and businesses seek additional ways to process and store information. One option available to users may be information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information may be handled, how the information may be handled, how much information may be processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems may include a variety of hardware and/or software components that may be configured to process, store, and/or communicate information. Information handling systems may include a monitor which may be used to display and communicate information. A monitor may modulate ambient light capabilities to change the brightness of the monitor.

SUMMARY

In accordance with the teachings of the present disclosure, disadvantages and problems associated with display brightness may be substantially reduced or eliminated.

In accordance with one embodiment of the present disclosure, a method is described for monitor brightness control that includes connecting with a device via a dock, the device including a sensor configured to detect a lighting condition of an environment surrounding the device. The method further includes linking the dock with a monitor. The method further includes detecting the lighting condition. Additionally, in response to a change in the lighting condition, the method includes matching the lighting condition with a monitor brightness setting in a plurality of brightness look-up-tables and adjusting a brightness level of the monitor based on the monitor brightness setting.

In accordance with another embodiment of the present disclosure, an information handling system includes a processor, a memory communicatively coupled to the processor, a docking station communicatively coupled to the processor and memory, and a brightness module including instructions in the memory. The instructions are executable by the processor, and, when executed, configure the brightness module to connect with a device via the docking station, the device including a sensor configured to detect a lighting condition of an environment surrounding the device, link the docking station with a monitor, detect the lighting condition, in response to a change in the environmental brightness level, match the lighting condition with a monitor brightness setting in a plurality of brightness look-up-tables, and adjust a brightness level of the monitor based on the monitor brightness setting.

In accordance with another embodiment of the present disclosure, a non-transitory machine-readable medium including instructions stored therein is disclosed. The instructions are executable by one or more processors, and when read and executed, enable the processor to connect with a device via a dock, the device including a sensor configured to detect a lighting condition of an environment surrounding the device, link the dock with a monitor, detect the lighting condition, in response to a change in the environmental brightness level, match the lighting condition with a monitor brightness setting in a plurality of brightness look-up-tables, and adjust a brightness level of the monitor based on the monitor brightness setting.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
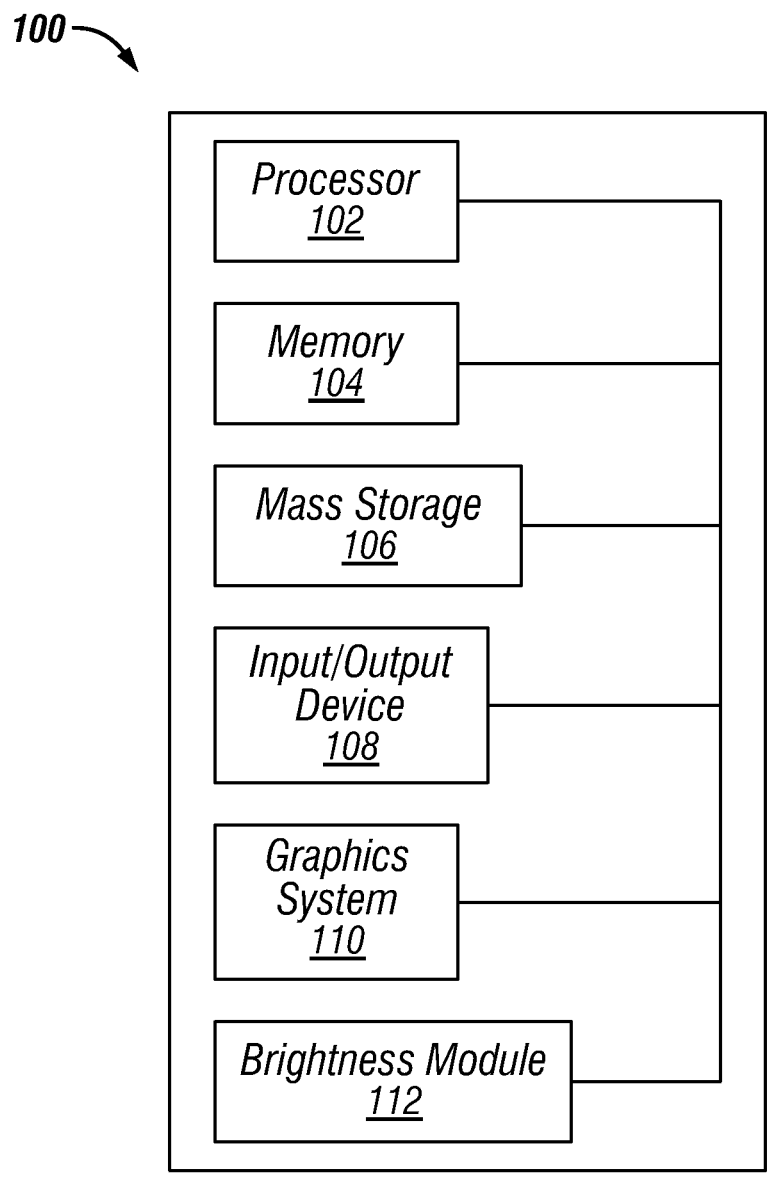
FIG. 1 illustrates a block diagram of an example information handling system, in accordance with certain embodiments of the present disclosure.
Figure 2:
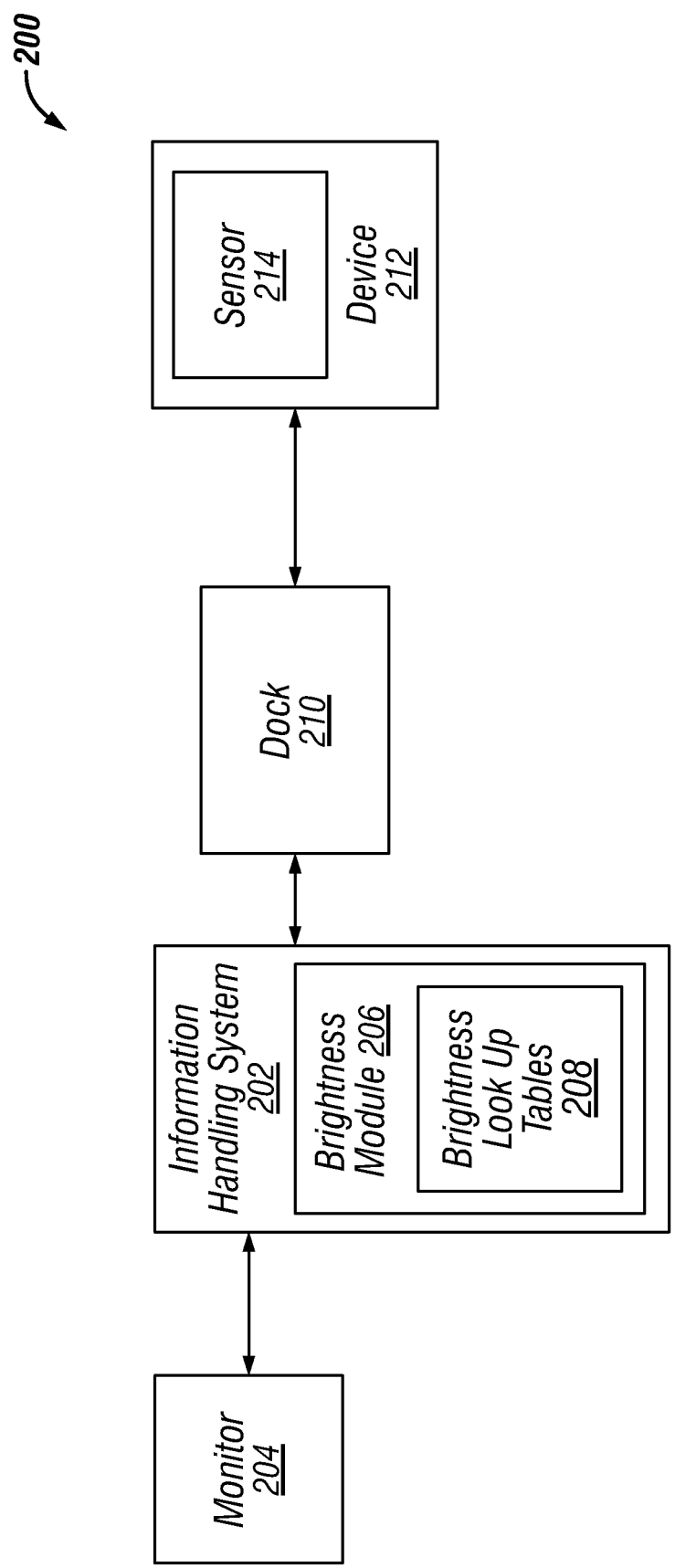
FIG. 2 illustrates a block diagram of an example network environment in which an information handling system may operate with other local or remote devices, in accordance with certain embodiments of the present disclosure.
Figure 3:
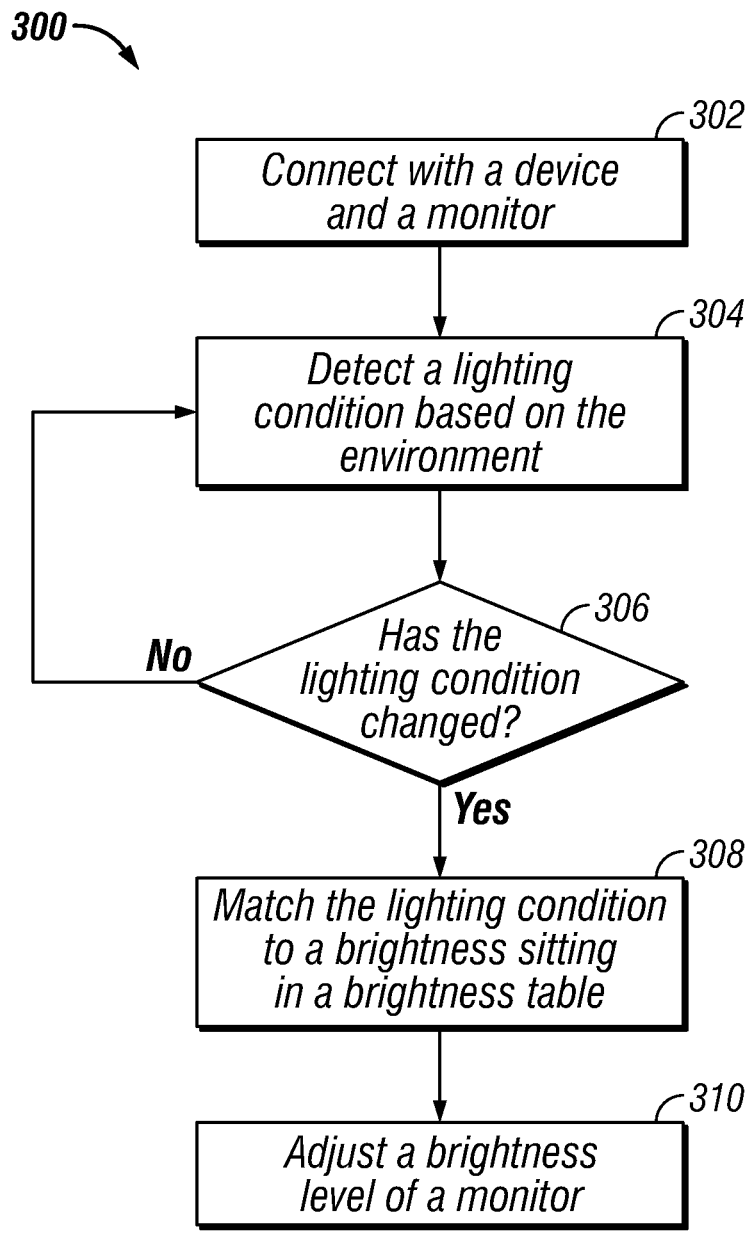
FIG. 3 illustrates a flow chart for an example method for monitor brightness control, in accordance with certain embodiments of the present disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100, in accordance with certain embodiments of the present disclosure. Information handling system 100 may generally be operable to receive data from, and/or transmit data to, other information handling systems 100. In one embodiment, information handling system 100 may be a desktop computer, laptop computer, mobile wireless device, wireless communication device, and/or any other suitable computing device. In the same or alternative embodiments, information handling system 100 may be a server or a storage array configured to include multiple storage resources (e.g., hard drives) in order to manage large amounts of data. In some embodiments, information handling system 100 may include, among other suitable components, processor 102, memory 104, mass storage device 106, input-output device 108, graphics system 110, brightness module 112, monitor 114, dock 116, sensor 118, and device 120.

Processor 102 may include any system, device, or apparatus operable to interpret and/or execute program instructions and/or process data. Processor 102 may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104, mass storage device 106, and/or another component of system 100.

Memory 104 may be communicatively coupled to processor 102 and may include any system, device, or apparatus operable to retain program instructions or data for a period of time (e.g., computer-readable media). Memory 104 may include random access memory (RAM), electrically erasable programmable read-only memory (EEPROM), flash memory, magnetic storage, opto-magnetic storage, or any suitable selection and/or array of volatile or non-volatile memory that retains data after power to system 100 may be removed.

Mass storage device 106 may include one or more storage resources (or aggregations thereof) communicatively coupled to processor 102 and may include any system, device, or apparatus operable to retain program instructions or data for a period of time (e.g., computer-readable media). Mass storage device 106 may retain data after power to system 100 may be removed. Mass storage device 106 may include one or more hard disk drives (HDDs), magnetic tape libraries, optical disk drives, magneto-optical disk drives, compact disk drives, compact disk arrays, disk array controllers, solid state drives (SSDs), and/or any computer-readable medium operable to store data.

Input-output device 108 may be communicatively coupled to processor 102 and may include any instrumentality or aggregation of instrumentalities by which a user may interact with system 100 and its various information handling resources by facilitating input from a user allowing the user to manipulate system 100 and output to a user allowing system 100 to indicate effects of the user's manipulation. For example, input-output device 108 may permit a user to input data and/or instructions into system 100 (e.g., via a keyboard, pointing device, and/or other suitable means), and/or otherwise manipulate system 100 and its associated components. In these and other embodiments, input-output device 108 may include other user interface elements (e.g., a keypad, buttons, and/or switches placed in proximity to a monitor) allowing a user to provide input to system 100.

Graphics system 110 may be communicatively coupled to processor 102 and may include any system, device, or apparatus operable to receive and process video information. Graphics system 110 may additionally be operable to transmit digital video information to a monitor. Graphics system 110 may include any internal graphics capabilities including for example, but not limited to, integrated graphics or a graphics card. Graphics system 110 may include graphics drivers, graphics processors, and/or any other suitable components.

Brightness module 112 may include logic or instructions for execution by a processor such as processor 102. The logic or instructions of brightness module 112 may be resident within a memory 104 or mass storage device 106 communicatively coupled to processor 104. Brightness module 112 may be implemented by any suitable software, hardware, firmware, or combination thereof configured as described herein. Brightness module 112 may be implemented by any suitable set of files, instructions, or other digital information. Brightness module 112 may include a set of files or other information making up, for example, a virtual machine installation such as an operating system, a virtual deployment environment, or a secured module such as a secured browser. Brightness module 112 may include such an installation to be installed and configured in the same way among multiple of information handling systems 100. Brightness module may adjust the brightness of a monitor, as discussed in further detail with reference to FIG. 2.

FIG. 2 illustrates a block diagram of example network environment 200 in which an information handling system may operate with other local or remote devices, in accordance with certain embodiments of the present disclosure. Network environment 200 may include information handling system 202, monitor 204, brightness module 206, brightness look-up-tables 208, dock 210, device 212, and sensor 214.

Monitor 204 may be communicatively coupled to information handling system 202 and appropriate components of information handling system 202 (e.g., a processor such as processor 102 as shown in FIG. 1). Monitor 204 may include any instrumentality or aggregation of instrumentalities to display information to a user. For example, monitor 204 may be a liquid crystal display (LCD), organic light-emitting diode (OLED) display, plasma display, and/or any other suitable display. Monitor 204 may include a display suitable for creating graphic images and/or alphanumeric characters recognizable to a user. In certain embodiments, monitor 204 may be an integral part of a chassis (not explicitly shown) and receive power from power supplies (not explicitly shown) of the chassis, rather than being coupled to the chassis via a cable. In some embodiments, monitor 204 may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor.

In some embodiments, the lighting conditions of the environment surrounding monitor 204 may vary while a user is operating information handling system 202. The brightness of monitor 204 may need to be adjusted based on the environmental lighting conditions. Some embodiments of monitor 204 may include a sensor to enable monitor 204 to detect the environmental lighting conditions and adjust the brightness of the monitor accordingly. However, many embodiments of monitor 204 do not include sensors to detect the environmental lighting conditions. Therefore, the ability to control the brightness of monitor 204 using a sensor on a separate device (e.g., sensor 214 on device 212) may be desired to optimize the brightness of monitor 204 based on the environmental lighting conditions.

Dock 210 may be any suitable type of router or docking station. Dock 210 may include the ability to create a network between one or more devices, such as device 212 and information handling system 202. The network may include, for example, an ad hoc network, a personal area network (PAN), a local area network (LAN), a wide area network (WAN), a metropolitan area network (MAN), or one or more portions of the Internet or a combination of two or more of these network types. One or more portions of the network may be wired or wireless. As an example, the network may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), WiGig (operating in the 60 GHz frequency band) or other suitable wireless network or a combination of two or more of these.

Device 212 may be communicatively coupled to dock 210. Device 212 may be a personal computer (e.g., desktop or laptop), tablet computer, mobile device (e.g., personal digital assistant (PDA) or smart phone), a consumer electronic device, or another suitable device and may vary in size, shape, performance, functionality, and price. Device 212 may include random access memory (RAM), one or more processing resources such as a central processing unit (CPU) or hardware or software control logic, read only memory (ROM), and/or other types of nonvolatile memory. Additional components of device 212 may include one or more disk drives, one or more storage devices, one or more communications ports (e.g., network ports) for communicating with external devices as well as various input and output (I/O) devices, such as a keyboard, a mouse, a touchscreen and/or a video display. Device 212 may also include one or more buses operable to transmit communication between the various hardware components. In some embodiments, device 212 may include a software application configured to allow for interaction with dock 210. Device 212 may be any platform including, but not limited to, Apple iOS, Apple OS X, Microsoft Windows, Android, Wyse ThinOS, or Linux.

Device 212 may contain one or more sensors 214. Sensor 214 may include any system, device, or apparatus operable to sense light. Sensor 214 may be a device to detect brightness levels of ambient light proximate to and/or remote from device 212, such as an ambient light sensor (ALS). Sensor 214 may be further configured to transmit the sensed information to device 212.

Dock 210 may allow device 212 to automatically dock with dock 210. Prior to an automatic dock with device 212, dock 210 may authenticate device 212. Dock 210 may authenticate devices by prompting for a user name and password, via Wired Equivalent Privacy (WEP) security, via Wi-Fi Protected Access (WPA) security, via a smart card, USB token, software token, secure credentials, or any other suitable authentication method. In other embodiments, dock 210 may allow device 212 to manually dock with dock 210. Dock 210 may dock with device 212 via a wireless connection or via a wired connection.

Dock 210 may receive light information from sensor 214. Dock 210 may transmit the sensed light information to brightness module 206 and/or any other suitable component of information handling system 202. Brightness module 206 may be communicatively coupled to monitor 204 and any other component of information handling system 202 such as a processor, a graphics system, and/or dock 210. Brightness module 206 may be similar to brightness module 112, as described with reference to FIG. 1. In some embodiments, brightness module 206 may perform brightness adjustments that may be reflected in monitor 204. In some embodiments, brightness module 206 may be implemented in, for example, any application, process, script, module, executable, executable program, server, executable object, library, function, or other suitable digital entity.

In some embodiments, brightness module 206 may be configured to adjust the brightness of monitor 204. Brightness module may adjust the brightness of monitor 204 based on a range of criteria including environmental light conditions (e.g., detected by sensor 214), user modified settings, monitor default settings, and/or any other suitable criteria. For example, if the environmental light detected by sensor 214 dims, brightness module 206 may cause monitor 204 to dim. Brightness module 206 may use industry standard interfaces to set the brightness level of monitor 204, such as Windows Display Driver Model (WDDM) or Advanced Configuration and Power Interface (ACPI). The use of industry standard interfaces may allow for any type of monitor from any manufacturer to be used with the present disclosure. Brightness module 206 may transmit a brightness change to monitor 204 using standard communication protocols typically used for user initiated changes in brightness levels.

In some embodiments, brightness module 206 may contain one or more brightness look-up-tables 208 that may contain environmental lighting conditions and associated brightness levels. For example, based on a given environmental lighting condition, as detected by sensor 214, brightness look-up-table 208 may contain a brightness setting appropriate for the given environmental lighting condition. There may be any number of entries in brightness look-up-table 208. For example, for a monitor supporting one-hundred brightness levels, brightness look-up-table 208 may contain one-hundred values, correlating each brightness level to an environmental lighting condition. In some embodiments, the values in brightness look-up-table 208 may be based on the manufacturer of monitor 204. In other embodiments, the values in brightness look-up-table 208 may be based on the type of monitor 204. For example, brightness look-up-table 208 may include a mapping from a standard brightness look-up-table 208 to a manufacturer or type specific brightness look-up-table 208 based on the brightness levels supported by the manufacturer of the monitor or the type of the monitor. The values in the brightness table may also reflect the average setting from other users with similar configurations. For example, for users with the same monitors and operating under same lighting conditions, if a plurality of users set their monitor brightness to "x," "x" could be the default value in brightness look-up-table 208.

Brightness module 206 may notify the basic input/output system (BIOS) to utilize brightness settings specified by brightness look-up-table 208 or brightness settings requested via monitor 204. During a reboot of information handling system 202, a default brightness level, as determined from brightness look-up-table 208, may be used. Once a user logs on to information handling system 202, the brightness of monitor 204 may be adjusted based on brightness look-up-table 208 associated with the logged-on user.

In some embodiments, the values in brightness look-up-table 208 may be defined based on analysis of field data. The field data may represent the brightness settings utilized by users in a variety of environmental lighting conditions. The field data may be analyzed to determine the optimal brightness level for a given environmental lighting condition based on the average user. In other embodiments, the values in brightness look-up-table 208 may be updated based on changes made by the user during operation of information handling system 202. For example, if a user changes the brightness of monitor 204 to be a different brightness than the current brightness level associated with the environmental lighting conditions stored in brightness look-up-table 208, brightness module 206 may update brightness look-up-table 208 to reflect the user's brightness preferences.

In other embodiments, the values in brightness look-up-table 208 may be based on the brightness settings of device 212. For example, if a user has defined brightness preferences for device 212 based on various environmental lighting conditions, brightness look-up-table 208 may include, for the same or similar environmental lighting conditions, corresponding values for the brightness level of monitor 204 such that the brightness of monitor 204 may be similar to the brightness of a display of device 212 under similar environmental lighting conditions.

The increments between brightness levels, as specified in brightness look-up-table 208, may not be uniform. For example, the brightness difference between a brightness level of ten and a brightness level of eleven may be a larger relative brightness difference than the brightness difference between a brightness level of nine and a brightness level of ten. However, a larger brightness level generally corresponds to a higher brightness of monitor 204.

FIG. 3 illustrates a flow chart for an example method 300 for monitor 204 brightness control, in accordance with certain embodiments of the present disclosure. The steps of method 300 may be performed by various computer programs, models or any combination thereof. The programs and models may include instructions stored on a computer-readable medium and operable to perform, when executed, one or more of the steps described below. The computer-readable medium may include any system, apparatus or device configured to store and/or retrieve programs or instructions such as a microprocessor, a memory, a disk controller, a compact disc, flash memory, or any other suitable device. The programs and models may be configured to direct a processor or other suitable unit to retrieve and/or execute the instructions from the computer readable media. For example, method 300 may be executed by processor 102, graphics system 114, brightness module 112, a user, and/or other suitable source. For illustrative purposes, method 300 may be described with respect to monitor 204 of FIG. 2; however, method 300 may be used for brightness control of any suitable display.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

At step 302, a dock may connect with a device and may link with a monitor. For example, dock 210 may connect with device 212 and monitor 204, as shown in FIG. 2. The device may contain a sensor, such as an ALS, to detect the lighting conditions of the environment. The sensor may be operable to detect the lighting conditions of the environment proximate to and/or remote from the device. The sensor may be configured to transmit the lighting conditions to the device. The dock may connect with the device automatically or may require user interaction to complete the connection. The monitor may be communicatively coupled to an information handling system that may be communicatively coupled to the dock. The monitor may be any type of monitor configured to creating graphic images and/or alpha-numeric characters recognizable to a user, such as an LCD, OLED display, plasma display, or any other suitable display. The dock may be any suitable device configured to create a network between one or more devices, such as a router or docking station. The dock may create a network between the monitor and the device containing the sensor.

At step 304, a sensor on the device may detect a lighting condition based on the environment. The sensor may detect the brightness level of the environment proximate to or remote from the monitor, such as monitor 204, as shown in FIG. 2. For example, sensor 214, e.g., an ALS, may be used to detect the lighting condition directly in front of monitor 204 or in the area surrounding monitor 204. While device 212 may include more than one sensor, the lighting condition may be detected by a single sensor. The sensor may detect multiple lighting conditions. The detected lighting condition may be transmitted from the sensor to the device. The device may transmit the lighting condition to the dock, which may transmit the lighting condition to a brightness module, such as brightness module 206, as shown in FIG. 2.

At step 306, method 300 may determine if the environmental lighting condition has changed from a previous reading. In some situations, the lighting conditions of the environment surrounding the monitor may vary while a user is viewing the monitor. Due to changes in the environmental lighting conditions, the brightness of the monitor may need to be adjusted based on the current lighting conditions.

If the environmental lighting condition has changed, then, at step 308 the environmental lighting condition is matched to a brightness setting. The environmental lighting condition may be matched to a brightness setting by using a brightness look-up-table, such as brightness look-up-table 208, as shown in FIG. 2. The brightness look-up-table may contain a matrix of environmental lighting conditions and associated brightness levels. For example, for a given environmental lighting condition, the brightness look-up-table may contain a brightness setting appropriate for the lighting condition. There may be any number of entries in the brightness look-up-table.

The values in the brightness look-up-table may be based on a brightness algorithm. The brightness algorithm may be validated by collected field data. The field data may include brightness settings preferred by users under a variety of lighting conditions. The algorithm may analyze the field data to determine the optimal brightness level for a given lighting condition based on average user settings.

In some embodiments, the brightness look-up-tables may be defined for a specific monitor type. The type of the monitor may include the model, the manufacturer, and/or the category of the monitor. While the increments between values in the brightness look-up-table may not be uniform, generally a higher brightness level in the brightness look-up-table may correspond to a higher brightness of the monitor. In other embodiments, the values in the brightness look-up-table may be based on a specific user and may be updated based on changes made by the user during operation of the information handling system. For example, if a user changes the brightness of the monitor to be a different brightness than the current brightness level associated with the environmental lighting conditions stored in the brightness look-up-table, the brightness module may update the brightness look-up-table to reflect the user's brightness preferences.

At step 310, the brightness of the monitor may be modified. For example, if the environmental brightness has decreased, the brightness of the monitor may be decreased. The brightness of the monitor may be modified by the brightness module. The brightness module may use industry standard interfaces to set the brightness level of the monitor. The brightness module may transmit a brightness change to a monitor using standard communication protocols typically used for user initiated changes in brightness levels.

In some embodiments, the sensor may be constantly detecting the brightness level of the environment and every subtle change may not be reflected in the brightness level of the monitor. The changes to the brightness level of the monitor may be delayed by a delay factor to improve the user experience and may be adjusted gradually.

However, if at step 306 there is no detected change in the environmental lighting conditions, then method 300 may return to step 304 to detect the environmental lighting conditions. Method 300 may continually monitor the environmental lighting conditions, at step 304, and determine if the lighting condition has changed, at step 306, during the time the monitor is powered on and/or during the time a device containing a sensor is connected to the dock.

Modifications, additions, or omissions may be made to method 300 without departing from the scope of the present disclosure. For example, the order of the steps may be performed in a different manner than that described and some steps may be performed at the same time. Additionally, each individual step may include additional steps without departing from the scope of the present disclosure.

Although the present invention and its advantages have been described in detail, it should be understood that various changes, substitutions and alternations can be made herein without departing from the spirit and scope of the invention as defined by the following claims.

What is claimed is:

1. A method for monitor brightness control comprising:
   connecting with a mobile communication device via a dock, the mobile communication device including a display, a processor, a memory, and a sensor configured to detect a lighting condition of an environment surrounding the mobile communication device;
   linking the dock with a monitor, the monitor being separate from the mobile communication device;
   detecting, based on light information received from the sensor of the mobile communication device, that the lighting condition has changed compared to a previously detected lighting condition;
   in response to the change in the lighting condition, matching the lighting condition with a monitor brightness setting in a brightness look-up-table DR the brightness look-up-table including:
   a plurality of lighting conditions each matched to a corresponding one of a plurality of monitor brightness settings, the plurality of lighting conditions and values of the corresponding monitor brightness settings with which they are matched being based at least on brightness settings of the display of the mobile communication device under the same or similar lighting conditions; and
   adjusting a brightness level of the monitor based on the monitor brightness setting matched to the lighting condition.

2. The method of claim 1, further comprising:
   matching the plurality of monitor brightness settings to the plurality of lighting conditions based on a plurality of field data, the field data including a plurality of monitor brightness settings utilized by users for a plurality of actual lighting conditions; and
   generating the brightness look-up-table based on the plurality of field data.

3. The method of claim 1, further comprising selecting the brightness look-up-table from a plurality of brightness look-up-tables based on a type of the monitor.

4. The method of claim 1, wherein the monitor brightness settings in the brightness look-up-table are updated based on a manual change in the brightness level of the monitor made by a user of the monitor.

5. The method of claim 1, wherein adjusting the brightness level of the monitor requires a user to be logged into an information handling system communicatively coupled to the monitor.

6. The method of claim 1, wherein the lighting condition is detected by a single sensor.

7. The method of claim 1, further comprising selecting the monitor brightness setting based on a mobile communication device brightness setting of the mobile communication device such that the brightness of the monitor is similar to the brightness of the display of the mobile communication device under similar lighting conditions.

8. An information handling system comprising:
   a processor;
   a memory communicatively coupled to the processor;
   a docking station communicatively coupled to the processor and memory; and
   a brightness module including instructions in the memory, the instructions executable by the processor, the instructions, when executed, configure the brightness module to:
   connect with a mobile communication device via the docking station, the mobile communication device including a display, a second processor, a second memory, and a sensor configured to detect a lighting condition of an environment surrounding the mobile communication device;
   detect, based on light information received from the sensor of the mobile communication device, that the lighting condition has changed compared to a previously detected lighting condition;
   in response to the change in the lighting condition, match the lighting condition with a monitor brightness setting in a brightness look-up-table, the brightness look-up-table including:

a plurality of lighting conditions each matched to a corresponding one of a plurality of monitor brightness settings, the plurality of lighting conditions and values of the corresponding monitor brightness settings with which they are matched being based at least on brightness settings of the display of the mobile communication device under the same or similar lighting conditions; and adjust a brightness level of a monitor linked to the docking station based on the monitor brightness setting matched to the lighting condition, the monitor being separate from the mobile communication device.

9. The system of claim 8, wherein the instructions further configure the brightness module to:

match the plurality of monitor brightness settings to the plurality of lighting conditions based on a plurality of field data, the field data including a plurality of monitor brightness settings utilized by users for a plurality of actual lighting conditions; and generate brightness look-up-table based on the plurality of field data.

10. The system of claim 8, wherein the instructions further configure the brightness module to select the brightness look-up-table from a plurality of brightness look-up-tables based on a type of the monitor.

11. The system of claim 8, wherein the monitor brightness settings in the brightness look-up-table are updated based on a manual change in the brightness level of the monitor made by a user of the monitor.

12. The system of claim 8, wherein adjusting the brightness level of the monitor requires a user to be logged into the information handling system.

13. The system of claim 8, wherein the lighting condition is detected by a single sensor.

14. The system of claim 8, wherein the instructions further configure the brightness module to select the monitor brightness setting based on a mobile communication device brightness setting of the mobile communication device such that the brightness of the monitor is similar to the brightness of the display of the mobile communication device under similar lighting conditions.

15. A non-transitory machine-readable medium comprising instructions stored therein, the instructions executable by one or more processors, the instructions, when read and executed for causing the processor to:

connect with a mobile communication device via a dock, the mobile communication device including a display, a second processor, a memory, and a sensor configured to detect a lighting condition of an environment surrounding the mobile communication device;

link the dock with a monitor, the monitor being separate from the mobile communication device;

detect, based on light information received from the sensor of the mobile communication device, that the lighting condition has changed compared to a previously detected lighting condition;

in response to the change in the lighting condition, match the lighting condition with a monitor brightness setting in a brightness look-up-table, the brightness look-up-table including:

a plurality of lighting conditions each matched to a corresponding one of a plurality of monitor brightness settings, the plurality of lighting conditions and values of the corresponding monitor brightness settings with which they are matched being based at least on brightness settings of the display of the mobile communication device under the same or similar lighting conditions; and adjust a brightness level of the monitor based on the monitor brightness setting matched to the lighting condition.

16. The non-transitory machine-readable medium of claim 15, wherein the instructions further causing the processor to:

match the plurality of monitor brightness settings to the plurality of lighting conditions based on a plurality of field data, the field data including a plurality of monitor brightness settings utilized by users for a plurality of actual lighting conditions; and generate brightness look-up-table based on the plurality of field data.

17. The non-transitory machine-readable medium of claim 15, wherein the instructions further configure the processor to select the brightness look-up-table from a plurality of brightness look-up-tables based on a type of the monitor.

18. The non-transitory machine-readable medium of claim 15, wherein adjusting the brightness level of the monitor requires a user to be logged into an information handling system communicatively coupled to the monitor.

19. The non-transitory machine-readable medium of claim 15, wherein the lighting condition is detected by a single sensor.

20. The non-transitory machine-readable medium of claim 15, wherein the instructions further causing the processor to select the monitor brightness setting based on a mobile communication device brightness setting of the mobile communication device such that the brightness of the monitor is similar to the brightness of the display of the mobile communication device under similar lighting conditions.

* * * * *